United States Patent
Matsunoshita et al.

(10) Patent No.: US 11,966,692 B2
(45) Date of Patent: Apr. 23, 2024

(54) DOCUMENT PROCESSING APPARATUS, DOCUMENT PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventors: Junichi Matsunoshita, Kanagawa (JP); Yasunari Kishimoto, Kanagawa (JP); Masakazu Fukunaga, Kanagawa (JP); Takashi Kikuchi, Kanagawa (JP); Taro Yokose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 596 days.

(21) Appl. No.: 16/853,771

(22) Filed: Apr. 21, 2020

(65) Prior Publication Data
US 2021/0192130 A1    Jun. 24, 2021

(30) Foreign Application Priority Data
Dec. 19, 2019    (JP) .................. 2019-229116

(51) Int. Cl.
*G06F 17/00*    (2019.01)
*G06F 40/174*    (2020.01)
(Continued)

(52) U.S. Cl.
CPC .......... *G06F 40/186* (2020.01); *G06F 40/174* (2020.01); *G06F 40/242* (2020.01); *G06Q 30/0241* (2013.01)

(58) Field of Classification Search
CPC .... G06F 40/186; G06F 40/174; G06F 40/242; G06Q 30/0241
See application file for complete search history.

(56) References Cited

U.S. PATENT DOCUMENTS 7,581,176 B2 *  8/2009  Wilson ................. G06F 40/174
                                                       715/252
9,189,469 B2   11/2015  Kanzaki et al.
(Continued)

FOREIGN PATENT DOCUMENTS

| JP | H0785044 | 3/1995 |
| JP | 2000227914 | 8/2000 |
| JP | 5466357 | 4/2014 |

OTHER PUBLICATIONS

Schriver, Karen, J. Johnson-Eilola, and S. A. Selber. "What do technical communicators need to know about information design." Solving problems in technical communication (2013): 386-427 (Year: 2013).*

(Continued)

*Primary Examiner* — Andrew T McIntosh
(74) *Attorney, Agent, or Firm* — JCIPRNET

(57) ABSTRACT

A document processing apparatus includes a processor configured to receive purpose information indicating a purpose of creating a document, extract item definition information corresponding to the purpose indicated by the received purpose information from item definition information stored in a memory for the item definition information in which one or more items to be posted in the document are defined in correspondence with the purpose of creating the document, extract an item value corresponding to each item defined in the extracted item definition information from item information stored in a memory for the item information including the item value of each item, and assign the extracted item value in each predetermined area of the document to create the document.

16 Claims, 7 Drawing Sheets

(51) Int. Cl.
*G06F 40/186* (2020.01)
*G06F 40/242* (2020.01)
*G06Q 30/0241* (2023.01)

(56) References Cited

U.S. PATENT DOCUMENTS

| | | | | |
|---|---|---|---|---|
| 10,922,473 | B1* | 2/2021 | Cogan | G06F 40/14 |
| 2005/0076295 | A1* | 4/2005 | Simske | G06T 11/60 |
| | | | | 715/273 |
| 2005/0144075 | A1* | 6/2005 | Magowan | G06Q 30/0273 |
| | | | | 705/14.69 |
| 2007/0038929 | A1* | 2/2007 | Miyazawa | G06F 40/174 |
| | | | | 715/210 |
| 2008/0005667 | A1* | 1/2008 | Dias | G06F 40/154 |
| | | | | 715/236 |
| 2009/0094508 | A1* | 4/2009 | Kanzaki | G06F 40/186 |
| | | | | 715/201 |
| 2009/0150765 | A1* | 6/2009 | Nagayama | G06F 40/186 |
| | | | | 715/234 |
| 2009/0276695 | A1* | 11/2009 | Hodges | G06F 40/186 |
| | | | | 715/249 |
| 2013/0311309 | A1* | 11/2013 | Napchi | G06Q 30/0277 |
| | | | | 705/14.73 |
| 2014/0298218 | A1* | 10/2014 | Gera | G06F 3/0481 |
| | | | | 715/765 |
| 2015/0046791 | A1* | 2/2015 | Isaacson | G06F 40/146 |
| | | | | 715/234 |
| 2015/0106691 | A1* | 4/2015 | Arzuffi | G06F 40/143 |
| | | | | 715/234 |
| 2020/0133642 | A1* | 4/2020 | Payne | G06F 8/38 |
| 2020/0151242 | A1* | 5/2020 | Cohen | H04L 67/02 |

OTHER PUBLICATIONS

Ali, Kamran, et al. "Adaptive layout for interactive documents." Smart Graphics: 9th International Symposium, SG 2008, Rennes, France, Aug. 27-29, 2008. Proceedings 9. Springer Berlin Heidelberg, 2008 (Year: 2008).*

Goldenberg, Eldan. "Automatic layout of variable-content print data." MCs Dissertation, School of Cognitive & Computing Sciences, Univeristy of Sussex, Brighton, UK (2002): 1-41 (Year: 2002).*

"Office Action of Japan Counterpart Application", dated Sep. 26, 2023, with English translation thereof, pp. 1-6.

"Decision of Refusal of Japan Counterpart Application", dated Feb. 6, 2024, with English translation thereof, p. 1-p. 3.

* cited by examiner

FIG. 2

INFORMATION ITEM CONFIGURATION INFORMATION

| No. | PURPOSE INFORMATION ||||| INFORMATION ITEM INFORMATION ||||||||||
| --- | --- | --- | --- | --- | --- | --- | --- | --- | --- | --- | --- | --- | --- | --- |
|  | INDUSTRY TYPE | SALES PROMOTION PURPOSE | DOCUMENT TYPE | TARGET CUSTOMER | #1 | #2 | #3 | #4 | #5 | #6 | #7 | #8 | #9 | #10 |
| 1 | APPAREL SHOP | RENOVATED STORE OPENING ANNOUNCEMENT | DIRECT MAIL | FEMALE IN 20s | THEME | STORE NAME | GREETING MESSAGE | STORE INFORMATION | MAIN VISUAL | - | - | - | - | - |
| 2 | APPAREL SHOP | RENOVATED STORE OPENING ANNOUNCEMENT | DIRECT MAIL | MALE IN 40s | THEME | STORE NAME | GREETING MESSAGE | STORE INFORMATION | COUPON | MAIN VISUAL | - | - | - | - |
| 3 | APPAREL SHOP | SALE | DIRECT MAIL | FEMALE IN 20s | THEME | EYECATCH | PRODUCT GUIDE | PRODUCT GUIDE | PRODUCT GUIDE | PRODUCT GUIDE | STORE INFORMATION | COUPON | MAIN VISUAL | - |
| 4 | APPAREL SHOP | SALE | BANNER IMAGE | FEMALE IN 20s | THEME | EYECATCH | STORE NAME | MAIN VISUAL | - | - | - | - | - | - |
| 5 | APPAREL SHOP | THANK-YOU NOTE | DIRECT MAIL | FEMALE IN 30s | ADDRESS | THEME | GREETING MESSAGE | STORE INFORMATION | MAIN VISUAL | - | - | - | - | - |
| 6 | AUTOMOBILE SALES | CAMPAIGN | DIRECT MAIL | MALE IN 30s | THEME | PRODUCT GUIDE | GREETING MESSAGE | STORE INFORMATION | COUPON | MAIN VISUAL | - | - | - | - |
| ... | | | | | | | | | | | | | | |

FIG. 3

POSTING ITEM CONFIGURATION INFORMATION

| INFORMATION ITEM | POSTING ITEM | DATA FORMAT |
|---|---|---|
| THEME (31) | MAIN COPY | text |
| | SUB COPY | text |
| | IMAGE PHOTOGRAPH | image |
| THEME (32) | MAIN COPY | text |
| | IMAGE PHOTOGRAPH | image |
| STORE NAME | STORE NAME | text |
| | LOGO IMAGE | image |
| STORE NAME | STORE NAME | text |
| STORE NAME | LOGO IMAGE | image |
| GREETING MESSAGE (33) | HEADER COPY | text |
| | BODY COPY | text |
| STORE INFORMATION | STORE NAME | text |
| | ADDRESS | text |
| | TELEPHONE NUMBER | text |
| | URL | text |
| | LOGO IMAGE | image |
| | MAP | image |
| STORE INFORMATION | STORE NAME | text |
| | URL | text |
| | MAP | image |
| STORE INFORMATION | LOGO IMAGE | image |
| | URL | text |
| PRODUCT GUIDE | PRODUCT NAME | text |
| | PRICE | text |
| | PRODUCT PHOTOGRAPH | image |
| PRODUCT GUIDE | PRODUCT NAME | text |
| | PRODUCT PHOTOGRAPH | image |
| PRODUCT GUIDE | PRODUCT NAME | text |
| | PRICE | text |

FIG. 4

CONTENT SET

| CONTENT SET ID | INFORMATION ITEM | POSTING ITEM | DATA FORMAT | CONTENT ID | CONTENT DATA |
|---|---|---|---|---|---|
| CS0001 | THEME | MAIN COPY | text | C0001 | "SPRING SALE" |
| | | SUB COPY | text | C0002 | "BIGGEST SALE THIS SPRING" |
| | | IMAGE PHOTOGRAPH | image | C0003 | image003.jpg |
| CS0002 | THEME | MAIN COPY | text | C0004 | "WINTER SALE" |
| | | SUB COPY | text | C0005 | "FULL OF TRENDY AUTUMN AND WINTER FASHION" |
| | | IMAGE PHOTOGRAPH | image | C0006 | image004.jpg |
| CS0003 | THEME | MAIN COPY | text | C0007 | "OPENING SALE" |
| | | IMAGE PHOTOGRAPH | image | C0008 | image008.jpg |
| | | IMAGE PHOTOGRAPH | image | C0009 | image003.jpg |
| CS0004 | PRODUCT INTRODUCTION | PRODUCT NAME | text | C0010 | "SPRING COAT" |
| | | PRICE | text | C0011 | "19,800 YEN" |
| | | PRODUCT PHOTOGRAPH | image | C0012 | image012.jpg |
| ... | | | | | |

FIG. 6

POSTING ITEM LAYOUT INFORMATION

| INFORMATION ITEM: THEME | |
|---|---|
| IMAGE PHOTOGRAPH | MAIN COPY |
| | SUB COPY |

~36

| INFORMATION ITEM: THEME | |
|---|---|
| MAIN COPY | |
| IMAGE PHOTOGRAPH | SUB COPY |

~37

| INFORMATION ITEM: THEME | |
|---|---|
| IMAGE PHOTOGRAPH | IMAGE PHOTOGRAPH |
| MAIN COPY | |

~38

DOCUMENT PROCESSING APPARATUS, DOCUMENT PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-229116 filed on Dec. 19, 2019.

BACKGROUND

(i) Technical Field

The present invention relates to a document processing apparatus, a document processing system, and a non-transitory computer readable medium storing a program.

(ii) Related Art

A configuration of a document related to sales promotion, such as a direct mail or a flyer, is basically fixed. Therefore, a document can be efficiently created by preparing several templates, selecting a template in a case where the document is created, and applying a predetermined posting item into a corresponding area of the template.

For example, JP2000-227914A discloses a technique in which a list of contents to be incorporated into a document is prepared in advance and contents to be associated with a layout frame is manually selected from the list of contents for the layout frame provided in the document.

JP5466357B is an example of the related art.

SUMMARY

By the way, a document is usually created for some purpose. For example, in a case where the document is for opening a renovated store, contents may be incorporated into an interior photograph of the store such that a store atmosphere can be understood to attract customers.

However, in the related art, although a purpose of a document to be created is clear, a layout frame for embedding information required to be incorporated into a template prepared in advance may be not provided, or information required to be incorporated into the document may be forgotten to be assigned. As a result, a case may occur in which a document having insufficient content to achieve the purpose is created.

Aspects of non-limiting embodiments of the present disclosure relate to a document processing apparatus, a document processing system, and a non-transitory computer readable medium storing a program that support creation of a document fit for a purpose of the document to be created in a case where the document is created by disposing elements constituting the document, compared with a case where the document is created without considering the purpose of the document to be created.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a document processing apparatus including a processor configured to receive purpose information indicating a purpose of creating a document, extract item definition information corresponding to the purpose indicated by the received purpose information from item definition information stored in a memory for the item definition information in which one or more items to be posted in the document are defined in correspondence with the purpose of creating the document, extract an item value corresponding to each item defined in the extracted item definition information from item information stored in a memory for the item information including the item value of each item, and assign the extracted item value in each predetermined area of the document to create the document.

BRIEF DESCRIPTION OF THE DRAWINGS

Exemplary embodiment(s) of the present invention will be described in detail based on the following figures, wherein:

FIG. 2 is a table showing an example of a data configuration of information item configuration information stored in an item definition information storage unit according to the present exemplary embodiment;

FIG. 3 is a table showing an example of a data configuration of posting item configuration information stored in the item definition information storage unit according to the present exemplary embodiment;

FIG. 4 is a table showing an example of a data configuration of a content set to be stored in a content set storage unit according to the present exemplary embodiment;

FIG. 6 is a diagram showing an example of a data configuration of posting item layout information to be stored in the layout information storage unit according to the present exemplary embodiment.

DETAILED DESCRIPTION

Hereinafter, an exemplary embodiment of the present invention will be described based on drawings.

Figure 1:
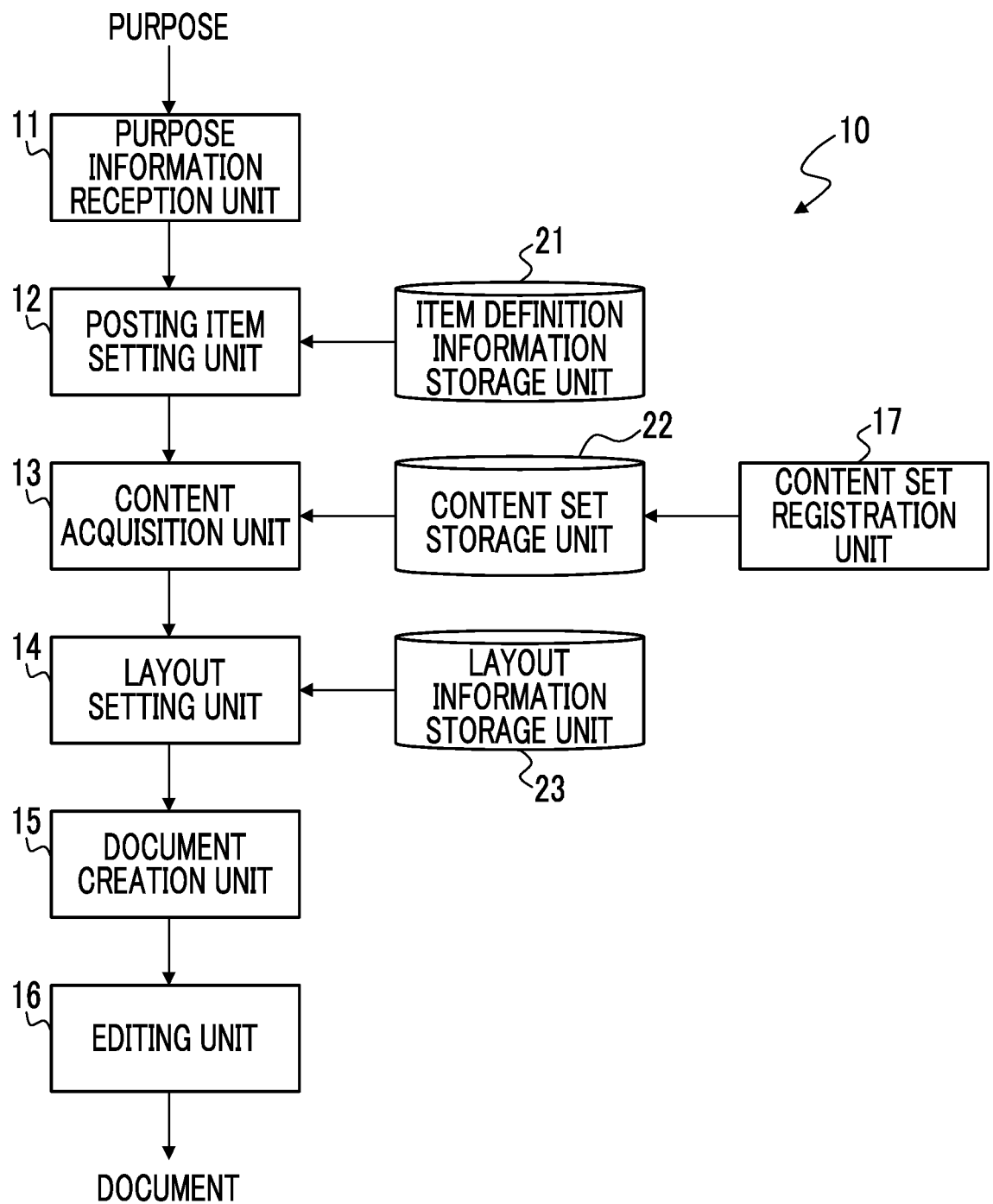
FIG. 1 is a block configuration diagram showing a document processing apparatus according to an exemplary embodiment.

FIG. 1 is a block configuration diagram showing a document processing apparatus according to the present exemplary embodiment. A document processing apparatus 10 according to the present exemplary embodiment includes a purpose information reception unit 11, a posting item setting unit 12, a content acquisition unit 13, a layout setting unit 14, a document creation unit 15, an editing unit 16, a content set registration unit 17, an item definition information storage unit 21, a content set storage unit 22, and a layout information storage unit 23. A component not used in the description of the present exemplary embodiment is omitted from the drawing.

The purpose information reception unit 11 receives purpose information indicating a purpose of creating a document designated by a user. The posting item setting unit 12 extracts item definition information corresponding to the purpose indicated by the received purpose information from the item definition information stored in the item definition information storage unit 21 to specify a posting item, fit for the purpose of creating the document, in the document. Although details will be described below, in the present exemplary embodiment, an item to be posted in the document may be referred to "posting item" other than "item" to clarify a difference from "information items" in which one or more items to be posted in the document are summarized. The content acquisition unit 13 selects a content set that matches a combination of the posting items defined by the extracted item definition information from the content sets stored in the content set storage unit 22 to acquire an item value of a posting item to be actually posted in the document, that is, the content data. In the present exemplary embodiment, the item value of the posting item, "content", and "content data" are used in the same meaning.

The layout setting unit 14 acquires layout information corresponding to a combination of the specified information items from the layout information stored in the layout information storage unit 23 to set a layout of the document. The document creation unit 15 applies the content acquired by the content acquisition unit 13 into a predetermined area (hereinafter also referred to as "layout frame") on the layout set by the layout setting unit 14 to create the document. The editing unit 16 allows the user to perform editing work such as adjusting a size of the layout frame for the content positioned by the document creation unit 15. The content set registration unit 17 allows the user to perform registration work of registering the content set in the content set storage unit 22.

FIGS. 2 and 3 are diagrams showing examples of data configurations of the item definition information stored in the item definition information storage unit 21 according to the present exemplary embodiment. In the item definition information, one or more items to be posted in the document are defined in correspondence with the purpose of creating the document (hereinafter referred to as "document creation purpose" or simply "purpose"). In the present exemplary embodiment, the item definition information is configured of two types of information shown in each of FIGS. 2 and 3, that is, information item configuration information and posting item configuration information.

The information item configuration information shown in FIG. 2 of the information item configuration information and the posting item configuration information, defines information item information including one or more items (hereinafter referred to as "information items") when the items configuring the document are classified according to the content of the information indicated by each item in correspondence with the purpose information indicating the purpose of creating the document. In the exemplary embodiment, the user is allowed to designate the purpose of creating the document using each item of a business type of the user "industry type", a purpose of sales promotion "sales promotion purpose", a type of document to be created "document type", and a target customer for sales "target customer". Therefore, the purpose information is configured of the items. The information item information includes one or more information items corresponding to the purpose indicated by the purpose information. For example, in the item definition information with an identification number "No." 1 shown in FIG. 2, a purpose of a document is designated by a combination of the item values of respective items of "apparel shop" as industry type, "renovated store opening announcement" as sales promotion purpose, "direct mail" as document type, and "female in 20s" as target customer, and the document is created by a combination of five information items of theme, store name, greeting message, store information, and main visual to achieve the purpose. In FIG. 2, a table is prepared such that ten information items can be set. "-" is inserted in a setting area where no setting has been made.

In the present exemplary embodiment, the case where the purpose is designated by four items is described as an example. However, the number and types of items indicating the purpose are not necessary to be limited thereto. Further, a plurality of pieces of information item information having different combinations of constituent information items may be set in correspondence with the same item values designated in the purpose information, that is, the same purpose. That is, a plurality of pieces of information item configuration information having an identical purpose may be defined. The number of variations of document to be completed increases as the number of pieces of information item configuration information defined for an identical purpose increases.

In the posting item configuration information shown in FIG. 3, the posting item constituting the information item and a data format of the posting item are set in the information item. The information item is associated with the information item of the information item configuration information shown in FIG. 2. The posting item is the item that is actually posted in the document as described above. In FIG. 3, the plurality of pieces of information item configuration information having different combinations of constituent posting items can be set in correspondence with the same information item of "theme", as shown in posting item configuration information 31 and 32. The number of variations of document to be completed increases as the number of pieces of posting item configuration information defined for the same information item increases.

In the present exemplary embodiment, as shown in FIGS. 2 and 3, the item constituting the document ("posting item" shown in FIG. 3) is defined in a two-stage hierarchy of a large item called the information item and a small item constituting the large item. (that is, "posting item" shown in FIG. 3). However, the posting item may be directly defined in correspondence with the purpose of creating the document without using the information item. Alternatively, the item constituting the document may be defined not in two stages but in three or more stages.

FIG. 4 is a table showing an example of a data configuration of a content set to be stored in the content set storage unit 22 according to the present exemplary embodiment. The content set is item information in which the information item, the item, the data format, a content ID, and content data are set in association with a content set ID as identification information of the content set. The information item, the item, and the data format among the above are as described with reference to FIGS. 2 and 3, and setting contents of the information item, the item, and the data format are, for example, preferably consistent with the information item, the posting item, and the data format shown in FIGS. 2 and 3. The content ID is identification information of the content data. The content data is the item value of each item actually posted in the document as described above. Information on at least a combination of the information item, the posting item, and the content data to be set in the content set is provided by the user, and each content set is set according to the provided information. A plurality of content sets that have the same information item, posting item, and data format set in the content set but differ only in a combination of the content ID and the content data can be registered. The number of variations of document to be completed increases as the number of content sets having the same information item, posting item, and data format increases.

Figure 5:
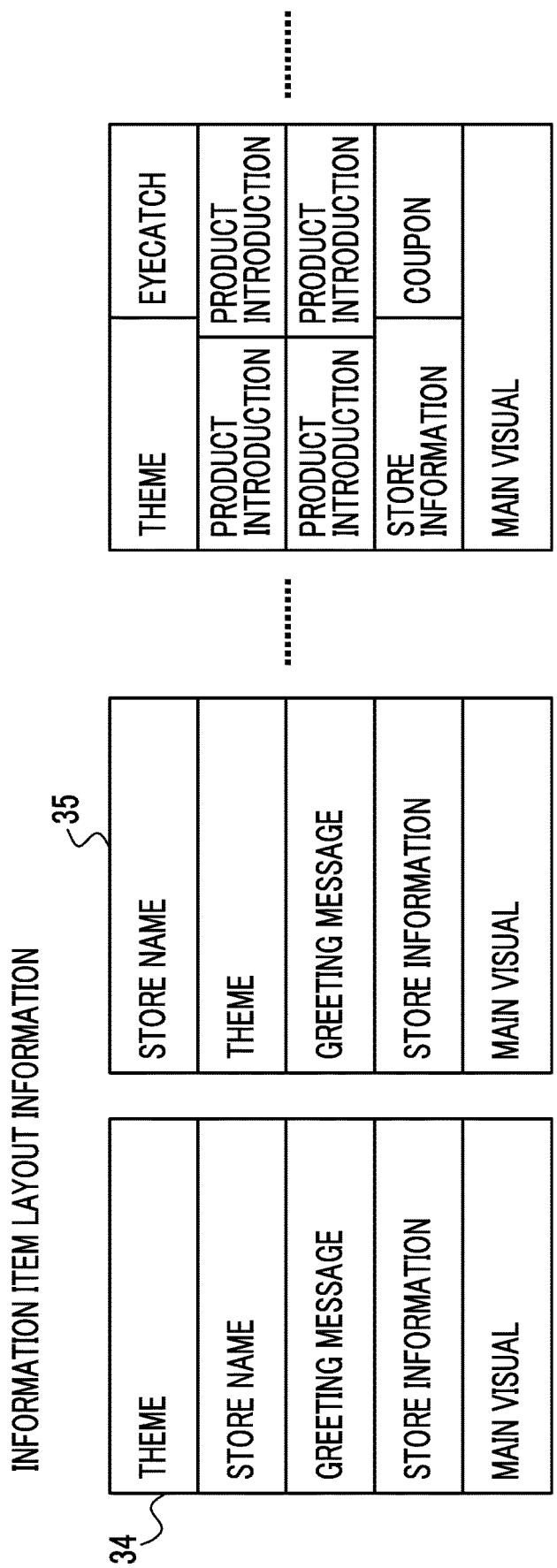
FIG. 5 is a diagram showing an example of a data configuration of information item layout information to be stored in a layout information storage unit according to the present exemplary embodiment.

FIG. 5 and FIG. 6 are diagrams showing an example of a data configuration of layout information to be stored in layout information storage unit 23 according to the present exemplary embodiment. The layout information is disposition information that defines a disposition place of the item value of the posting item. In the present exemplary embodiment, the layout information is configured of two types of information shown in each of FIGS. 5 and 6, that is, information item layout information and posting item layout information.

The information item layout information shown in FIG. 5 of the information item layout information and the posting item layout information is disposition information that defines disposition of the information items constituting the information item information in the document. Each of blocks 34 and 35 shown in FIG. 5 represents a page of the document and shows a positional relationship of the information items on the page. The block 34 is an example of a case where information items of theme, store name, greeting message, store information, and main visual are arranged in order from the top of the page. The block 35 has the same configuration of the information items as the block 34, but has a different disposition order of the information items. As in the example, a plurality of pieces of layout information in which the information items are assigned differently for the same information item information can be set in the information item layout information.

The posting item layout information shown in FIG. 6 is item disposition information that defines disposition of the posting items in the layout frame for respective information items designated by the information item layout information shown in FIG. 5. Each of blocks 36 and 37 shown in FIG. 6 is layout information corresponding to one information item, in the example, the information item "theme", and corresponds to the layout frame in which the information item "theme" shown in FIG. 5 is assigned. Each of the information items "theme" corresponding to the blocks 36 and 37 is configured of respective posting items of main copy, sub copy, and image photograph, but the disposition in the layout frame is different between the blocks. As in the example, a plurality of pieces of layout information in which the posting items are assigned differently for the same information items can be set in the posting item layout information. Although a block 38 is posting item layout information corresponding to the same information item "theme" as the blocks 36 and 37, the constituent posting items are different from the blocks. Although FIG. 6 illustrates only the information item "theme", the posting item layout information is similarly defined for other information items.

The document processing apparatus according to the present exemplary embodiment can be formed by a hardware configuration of a general-purpose computer such as a personal computer (PC). That is, the document processing apparatus has a memory such as a CPU, a ROM, a RAM, or a hard disk drive (HDD), and a communicator such as a user interface or a network interface.

Each of the components 11 to 17 in the document processing apparatus 10 is formed by a cooperative operation of a computer forming the document processing apparatus 10 and a program operated by a CPU mounted on the computer. Each of the storage units 21 to 23 is formed by an HDD mounted on the document processing apparatus 10.

Alternatively, the document processing apparatus may be configured of cloud or a plurality of computers. For example, the components 11 to 17 and the storage units 21 to 23 may be assigned on different computers, and the computer equipped with the components 11 to 17 may use the external storage units 21 to 23 through a network.

The program used in the present exemplary embodiment can be provided not only by the communicator but also by being stored in a computer-readable recording medium such as a CD-ROM or a USB memory. The program provided from the communicator or the recording medium is installed in the computer, and the CPU of the computer sequentially executes the program to realize various pieces of processing.

Next, an operation in the present exemplary embodiment will be described. A feature of the present exemplary embodiment is to support the creation of the document fit for the purpose. However, in order to create the document fit for the purpose, there is a need to set in advance the information described above in the item definition information storage unit 21, the content set storage unit 22, and the layout information storage unit 23. The item definition information and the layout information are set in advance by a document creation service company side that owns the document processing apparatus 10. On the other hand, the information on at least the combination of the information item, the posting item, or the content data in the content set needs to be provided by the user side as described above. Therefore, the content set registration unit 17 generates a content set based on the information provided by the user and registers the generated content set in the content set storage unit 22. The document to be created in the present exemplary embodiment will be described assuming a document configured of one page, such as a flyer, a pop, a banner image, or a direct mail, for convenience of description.

Figure 7:
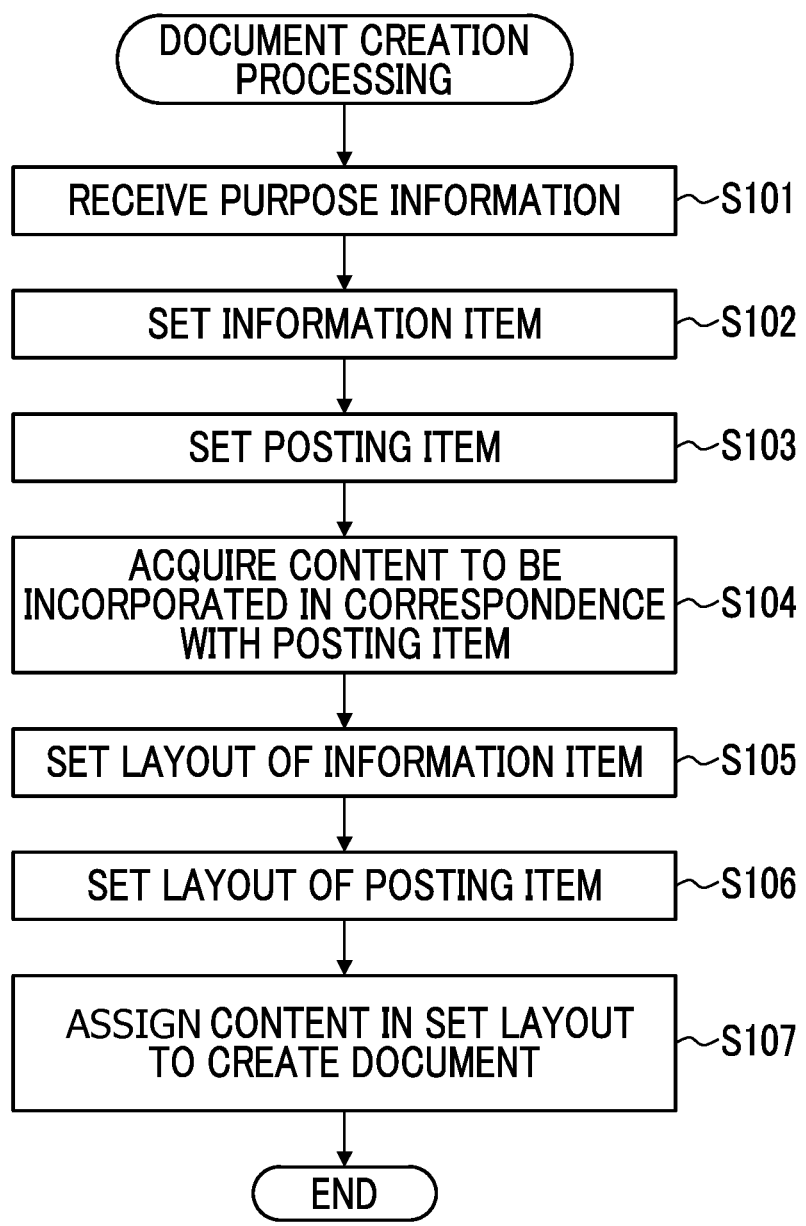
FIG. 7 is a flowchart showing document creation processing according to the present exemplary embodiment.

Hereinafter, the document creation processing according to the present exemplary embodiment will be described with reference to a flowchart shown in FIG. 7.

First, the user inputs a document creation purpose from a predetermined purpose designation screen. In the present exemplary embodiment, the industry type, the sales promotion purpose, the document type, and the target customer are exemplified as the items for designating the purpose. Therefore, an item value is designated for each item. For example, the user may manually input the item value of each item. However, in the present exemplary embodiment, a pull-down menu for displaying the item values in a list is prepared for each item, and the user selects an item value that matches the purpose from the pull-down menu. Basically, the user designates one item value for each item, but may not perform the designation for all items. Further, a plurality of item values may be designated for one item.

In the present exemplary embodiment, a case is assumed in which a service provided by the document creation service company that owns the document processing apparatus 10 is used by an external user. Therefore, an employee of the document creation service company may find out the purpose from the user and input the purpose to the document processing apparatus 10. Alternatively, the user may access the document processing apparatus 10 from a terminal such as a PC used by the user through a network such as the Internet. In the case, the user performs a predetermined operation to cause the browser to display the purpose designation screen transmitted from the document processing apparatus 10 on the PC and designates the item value of each item indicating the purpose. The purpose information reception unit 11 receives the purpose information including the item value of each item indicating the purpose designated as described above (step S101).

Subsequently, the posting item setting unit 12 extracts information item information corresponding to a combination of the item values of respective items included in the purpose information from the information item configuration information shown in FIG. 2, included in the item definition information storage unit 21. Accordingly, the posting item setting unit 12 sets the information item constituting the document (step S102). As described above, in the present exemplary embodiment, determination is made that what kind of information item is required to be included in the document to create a document whose purpose is achieved.

By the way, the user does not always designate all items indicating the purpose from the purpose designation screen as described above. In the case, the item definition information corresponding to the designated item value for the purpose is retrieved and acquired. Therefore, a plurality of pieces of item definition information may be used. For example, in a case where the user designates "apparel shop" as the industry type, "renovated store opening announcement" as the sales promotion purpose, and "direct mail" as the document type, but does not designate the target customer, the posting item setting unit 12 acquires records of record numbers 1 and 2 that match the designated items. A plurality of pieces of information item configuration information having the same purpose may be registered in the item definition information storage unit 21. In the case, the posting item setting unit 12 also acquires the plurality of pieces of information item information. As described above, in the case where the plurality of pieces of information item information corresponding to the purpose indicated by the received purpose information is stored in the information item configuration information of the item definition information storage unit 21, the posting item setting unit 12 may present the plurality of pieces of information item configuration information corresponding to the purpose to the user and allow the user to select one record, that is, one piece of information item information from the presented pieces of information item configuration information. Alternatively, for example, the posting item setting unit 12 may automatically perform the selection in accordance with a predetermined selection criterion such as information item information having a smaller record number, information item information having a larger number of selections in the past, or weighting of respective items constituting the purpose to calculate a degree of purpose matching. The information item information corresponding to the designated purpose is extracted from the information item configuration information set in the item definition information storage unit 21, similar to the case where the plurality of item values are selected for one item.

Subsequently, the posting item setting unit 12 extracts a posting item corresponding to the information item determined in step S102 from the posting item configuration information shown in FIG. 3, included in the item definition information storage unit 21, to set an item to be posted (that is, posting item) in the document (step S103). For example, in a case where the information item set in step S102 includes "greeting message", a record corresponding to the information item "greeting message" is only one of the posting item configuration information 33 in the setting example shown in FIG. 3. Therefore, the posting item is uniquely determined as "header copy" and "body copy". For example, there are a plurality of records corresponding to the information item "theme" of the posting item configuration information 31 and 32. As described above, in a case where the plurality of pieces of posting item configuration information corresponding to the information item is stored in the item definition information storage unit 21, the posting item setting unit 12 may present the corresponding pieces of posting item configuration information to the user and allow the user to select one record (that is, posting item configuration information). Alternatively, for example, the posting item setting unit 12 may automatically perform the selection in accordance with a predetermined selection criterion such as posting item configuration information having a larger number of posting items constituting the information item or posting item configuration information having a larger number of selections in the past.

Subsequently, the content acquisition unit 13 acquires content to be incorporated in correspondence with each of the determined posting items (step S104). In step S103, the posting item setting unit 12 determines the posting item to be incorporated in each information item determined in step S102. For example, in a case where determination is made that the posting item for the information item "theme" is configured of a combination of "main copy", "sub copy", and "image photograph", the content acquisition unit 13 extracts a content set in which the information item is "theme" and the posting item is configured of the combination of "main copy", "sub copy", and "image photograph" from the content sets stored in the content set storage unit 22 to acquire the content included in the content set. According to the setting example shown in FIG. 4, content sets whose content set IDs are CS0001 and CS0002 are extracted. As described above, in a case where a plurality of content sets that match the combination of the information item and the posting item determined by the posting item setting unit 12 are registered, the content acquisition unit 13 presents the corresponding content sets, particularly, the content data to the user and allows the user to select one content set.

As described above, in a case where the content acquisition unit 13 determines the content corresponding to the item to be posted in the document, the layout setting unit 14 first sets a layout of the information items (step S105). The information item layout information shown in FIG. 5 in the layout information storage unit 23 includes the layout information in which the disposition of the information items in the document is defined. Therefore, the layout setting unit 14 sets the layout of the information items with reference to the information item layout information corresponding to the information items constituting the information item information extracted in step S102. In a case where only one information item layout information is set for one information item, the layout setting unit 14 can automatically specify the information item as the one piece of information item layout information. As shown in the information item layout information 34 and 35 shown in FIG. 5, in a case where a plurality of pieces of information item layout information configured of the same information items are stored in the layout information storage unit 23 in correspondence with one piece of information item information, the layout setting unit 14 may allow the user to select one piece of information item layout information from the plurality of pieces of information item layout information. Alternatively, for example, the layout setting unit 14 may automatically perform the selection in accordance with a predetermined selection criterion such as information item layout information having a larger number of selections in the past or weighting of respective information items constituting the information item layout information to calculate the degree of purpose matching.

In a case where the layout of the information items is set as described above, next, the layout setting unit 14 sets a layout of respective posting items constituting the information item (step S106). That is, the document creation unit 15 assigns the contents of the posting items in the layout frame for the information items laid out in the document, and the layout setting unit 14 selects the posting item layout information to be used for the disposition. In a case where only one piece of posting item layout information having the same constituent posting items is set for one information item, the layout setting unit 14 can automatically specify the information item as the one piece of posting item layout information. As shown in the posting item layout information 36 and 37 shown in FIG. 6, in a case where a plurality of posting item layout information configured of the same posting items (that is, "main copy", "sub copy", and "image photograph") in correspondence with one information item are stored in the layout information storage unit 23, the layout setting unit 14 may allow the user to select one posting item layout information from the plurality of posting item layout information. Alternatively, for example, the layout setting unit 14 may automatically perform the selection in accordance with a predetermined selection criterion such as posting item layout information having a larger number of selections in the past.

As described above, in a case where the disposition of the information items in the document and the disposition of the posting items in the layout frame for the information items are set, the document creation unit 15 applies and assigns each content acquired by the content acquisition unit 13 into an area, set by the layout setting unit 14, where the corresponding posting items are posted (hereinafter referred to as a "posting frame") to create the document (step S107).

The document can be created as described above. However, there may be an imbalance between a size of the content and a size of the posting frame for the corresponding posting item. The content may be expanded or reduced to cope with the imbalance, of course. However, the content may be difficult to visually recognize in a case where the content is reduced too much, for example. There is a need to consider a balance of contents in the entire document. In the present exemplary embodiment, the editing unit 16 is provided. The editing unit 16 displays the document created by the document creation unit 15 on the PC used by the user. The sizes of the layout frame for the information item and the posting frame for the posting item included in each information item are adjusted. As described above, the user may adjust the balance of the contents in the document to complete the document. Alternatively, instead of always causing the user to make adjustments, the editing unit 16 may compare the size of the content with the size of the posting frame for the corresponding posting item, and automatically adjust the content in a case where a difference therebetween is within a predetermined threshold value and allow the user to adjust the content as described above in a case where the difference exceeds the threshold value.

As described above, according to the present exemplary embodiment, the user is allowed to designate the purpose of creating a document and the document can be created without omitting the item fit for the purpose of creating the document. For example, in a case where one piece of information item configuration information corresponding to the purpose, one piece of posting item configuration information corresponding to each information item constituting the information item information included in the information item configuration information, one piece of information item layout information corresponding to the information item information, and one piece of posting item layout information corresponding to each information item included in the information item layout information are set in each of the storage units 21 to 23, the document processing apparatus 10 can automatically create the document in a case where the purpose of the document is designated. However, in the case, a document having the same layout is created for the same purpose. Therefore, as described above, the plurality of pieces of information item configuration information are set for the same purpose, the plurality of pieces of posting item configuration information are set for the same information item, the plurality of pieces of information item layout information are set for the same information item information, and the plurality of pieces of posting item layout information are set for the same information item, and thus various variations of documents, in other words, documents having different layouts can be created for the same purpose.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing apparatus comprising:
a processor configured to:
  receive purpose information indicating a purpose of creating a document;
  extract item definition information corresponding to the purpose indicated by the received purpose information from item definition information stored in a memory for the item definition information in which one or more items to be posted in the document are defined in correspondence with the purpose of creating the document;
  extract an item value corresponding to each item defined in the extracted item definition information from item information stored in a memory for the item information including the item value of each item;
  acquire a plurality of information item information corresponding to the purpose information which has been received, wherein the plurality of information item is associated with the purpose information in a predetermined manner based on the item definition information;

select a content set that matches a combination of the one or more items defined by the extracted item definition information to acquire the item value of each item;

generate and register the content set based on the extracted item definition information;

set a content of a layout of the document based on information item layout information, wherein the content of the layout comprises the plurality of information item information; and assign the extracted item value in each predetermined area of the document to create the document, wherein the purpose of creating the document is designated by a combination of item values of the one or more items, and a field of the content of the layout of the document is determined by posting item layout information which is defined according to posting items of the content set which has been selected.

2. The document processing apparatus according to claim 1, wherein the item definition information defines each of the plurality of information item information including one or more information items indicating an item of information constituting the document; and wherein the information item is associated with an item corresponding to the information item among the one or more items corresponding to the purpose of creating the document.

3. The document processing apparatus according to claim 2, wherein the memory for the item definition information stores a plurality of pieces of information item information having different combinations of constituent information items in correspondence with an identical purpose.

4. The document processing apparatus according to claim 3, wherein the processor is configured to allow a user to select one piece of information item information from a corresponding information item information in a case where a plurality of pieces of information item information corresponding to the purpose indicated by the received purpose information is stored in the memory for the item definition information.

5. The document processing apparatus according to claim 2, wherein the memory for the item definition information stores a plurality of pieces of item configuration information having different combinations of constituent items in correspondence with an identical information item.

6. The document processing apparatus according to claim 5, wherein the processor is configured to allow the user to select one piece of item configuration information from a corresponding item configuration information in a case where a plurality of pieces of item configuration information corresponding to the information item included in the information item information corresponding to the purpose indicated by the received purpose information is stored in the memory for the item definition information.

7. The document processing apparatus according to claim 1, wherein the item information is configured by associating the information item with item configuration information corresponding to the information item and an item value of each item constituting the item configuration information.

8. The document processing apparatus according to claim 7, wherein the processor is configured to allow the user to select one piece of item information from a corresponding item information in a case where a plurality of pieces of item information corresponding to the information item included in the information item information corresponding to the purpose indicated by the received purpose information is stored in the memory for the item information.

9. The document processing apparatus according to claim 1, wherein the processor is configured to assign the extracted item value in each area designated by disposition information relating to a disposition of the items to automatically create the document.

10. The document processing apparatus according to claim 2, wherein the processor is configured to create the document by referring to disposition information in which a disposition of the information items included in the information item information is defined in correspondence with the information item information.

11. The document processing apparatus according to claim 10, wherein a memory for the disposition information stores a plurality of pieces of disposition information in which the information items included in the information item information are differently assigned in correspondence with identical information item information.

12. The document processing apparatus according to claim 11, wherein the processor is configured to allow the user to select one piece of disposition information from a corresponding disposition information in a case where a plurality of disposition information corresponding to the information item information corresponding to the purpose indicated by the received purpose information is stored in the memory for the disposition information.

13. The document processing apparatus according to claim 2, wherein a memory for the disposition information stores a plurality of pieces of item disposition information in which constituent items are differently assigned in correspondence with an identical information item.

14. The document processing apparatus according to claim 13, wherein the processor is configured to allow the user to select one piece of item disposition information from a corresponding item disposition information in a case where a plurality of pieces of item disposition information corresponding to the information items included in the information item information corresponding to the purpose indicated by the received purpose information are stored in the memory for the disposition information.

15. A document processing system comprising:
a processor;
an item definition information memory that stores item definition information in which one or more items to be posted in a document are defined in correspondence with a purpose of creating the document;
an item information memory that stores item information including an item value of each item; and
a disposition information memory that stores disposition information relating to a disposition of the items,
wherein the processor is configured to:

receive purpose information indicating the purpose of creating the document;

extract item definition information corresponding to the purpose indicated by the received purpose information from the item definition information memory;

extract an item value corresponding to each item defined in the extracted item definition information from the item definition information stored in the item information memory;

acquire a plurality of information item information corresponding to the purpose information which has been received, wherein the plurality of information item is associated with the purpose information in a predetermined manner based on the item definition information;

select a content set that matches a combination of the one or more items defined by the extracted item definition information to acquire the item value of each item;

generate and register the content set based on the extracted item definition information;

set a content of a layout of the document based on information item layout information, wherein the content of the layout comprises the plurality of information item information; and assign the extracted item value in each area designated by the disposition information to create the document, wherein the purpose of creating the document is designated by a combination of item values of the one or more items, and a field of the content of the layout of the document is determined by posting item layout information which is defined according to posting items of the content set which has been selected.

16. A non-transitory computer readable medium storing a program for causing a computer to realize:

a function of receiving purpose information indicating a purpose of creating a document;

a function of extracting item definition information corresponding to the purpose indicated by the received purpose information from item definition information stored in a memory for the item definition information in which one or more items to be posted in the document are defined in correspondence with the purpose of creating the document;

a function of extracting an item value corresponding to each item defined in the extracted item definition information from item information stored in a memory for the item information including the item value of each item;

a function of acquiring a plurality of information item information corresponding to the purpose information which has been received, wherein the plurality of information item is associated with the purpose information in a predetermined manner based on the item definition information;

a function of selecting a content set that matches a combination of the one or more items defined by the extracted item definition information to acquire the item value of each item;

a function of generating and register the content set based on the extracted item definition information;

a function of setting a content of a layout of the document based on information item layout information, wherein the content of the layout comprises the plurality of information item information; and a function of disposing the extracted item value in each predetermined area of the document to create the document, wherein the purpose of creating the document is designated by a combination of item values of the one or more items, and a field of the content of the layout of the document is determined by posting item layout information which is defined according to posting items of the content set which has been selected.

* * * * *